United States Patent [19]

Reed, III

[11] Patent Number: 5,549,260
[45] Date of Patent: Aug. 27, 1996

[54] ACTIVE CONTROL DEVICE FOR AIRCRAFT TAIL BUFFET ALLEVIATION

[75] Inventor: Wilmer H. Reed, III, Hampton, Va.

[73] Assignee: Dynamic Engineering, Inc., Newport News, Va.

[21] Appl. No.: 380,005

[22] Filed: Jan. 27, 1995

[51] Int. Cl.$^6$ ......................................................... G05D 1/00
[52] U.S. Cl. ........................ 244/195; 244/75 A; 244/206; 364/434
[58] Field of Search .................................. 244/195, 75 A, 244/206, 76 R, 75 R, 200, 191, 87, 91, 76 C; 364/434

[56] References Cited

U.S. PATENT DOCUMENTS

| | | | |
|---|---|---|---|
| 3,448,714 | 6/1969 | Brooks | 244/206 X |
| 4,535,714 | 8/1985 | Peterson | 244/206 X |
| 4,706,902 | 11/1987 | Destaynder et al. | 244/76 C |
| 4,809,553 | 3/1989 | Reed, III | 73/583 |
| 5,236,149 | 8/1993 | Mackay | 244/206 X |
| 5,314,085 | 5/1994 | Reed, III | 416/91 |
| 5,375,794 | 12/1994 | Bleeg | 244/195 X |

OTHER PUBLICATIONS

"Rotating Cylinder flaps for V/S.T.O.L. Aircraft" Aircraft engineering vol. 36 Oct. 10, 1964 pp. 304–309, Caldevon.
Lee et al., Wind–Tunnel Studies of F/A–18 Tail Buffet, Jan.–Feb., 1992, pp. 146–152, vol. 29, Journal of Aircraft.

Primary Examiner—Christopher P. Ellis
Attorney, Agent, or Firm—Joseph Scafetta, Jr.

[57] ABSTRACT

A rotatable slotted cylinder (RSC), partially embedded within the contours of a tail surface, such as an aircraft tail airfoil, serves as a force-producing element in a closed-loop active control system for buffet alleviation. A longitudinal axis of the RSC runs spanwise to the airfoil at or near the three-quarter chord location. In a so-called "home" position, the RSC projects as two small spanwise humps out of opposite sides of the tail surface. By active feedback control using a buffet response signal measured by an accelerometer, the RSC rotates up to ±45° maximum deflection from the home position, thus allowing free stream air to flow through the airfoil, thereby creating lift forces for the active alleviation of the buffet response on the tail surface. An alternate embodiment of the invention places the RSC and a drive motor assembly outside of and adjacent to the tail surface near the airfoil quarter chord station. In this closed-loop active control system, the RSC is driven to rotate relative to the home position. The system alters the pressures on the tail surface, thus developing lift forces necessary to counter the buffet response. The invention allows a low-cost, lightweight solution to alleviate severe buffet response on the tail surfaces of a fighter aircraft at high angles of attack. Thus, the invention overcomes the problem of extreme vibrations which have caused premature structural fatigue failures and the need for costly repairs.

15 Claims, 3 Drawing Sheets

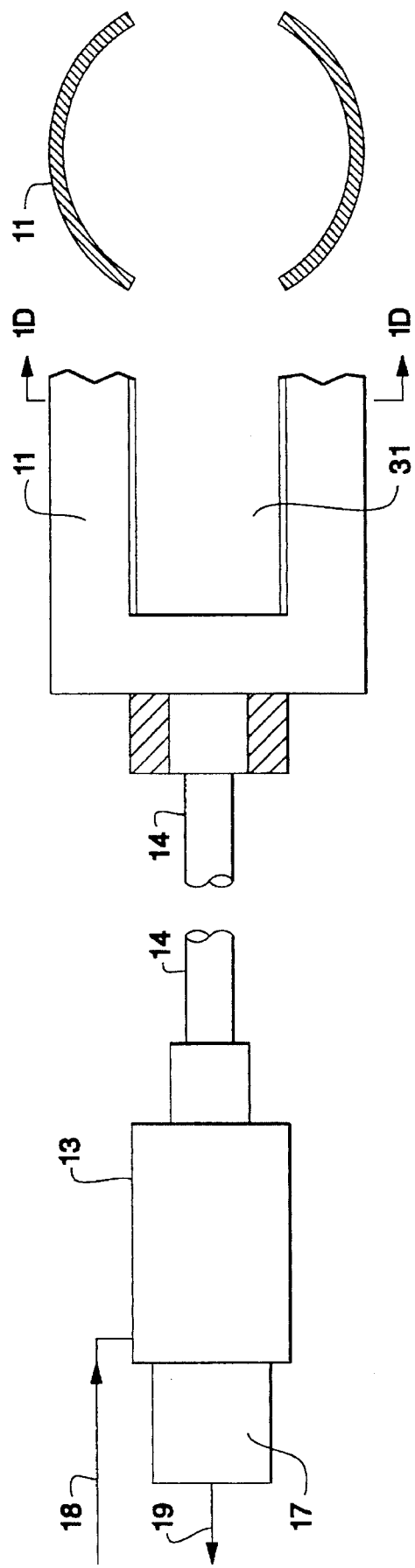

ACTIVE CONTROL DEVICE FOR AIRCRAFT TAIL BUFFET ALLEVIATION

BACKGROUND OF THE INVENTION

1. Field of the Invention

The present invention concerns a device for generating aerodynamic forces for the active control of buffet response of tail surfaces on an aircraft.

2. Description of the Related Art

The tail surfaces of a high-speed fighter aircraft operating at a high angle of attack are enveloped by the wake of turbulent vortex flow generated upstream by leading edges of the wings. This unsteady flow field produces dynamic loads and results in severe buffet responses on such tail surfaces. For instance, on the F-18 aircraft, buffet responses as high as ±450 g's have been measured on the vertical tail tips during high angle-of-attack flight. Such vibrations have resulted in premature fatigue failures of the structure and costly efforts to re-engineer and strengthen the structure.

Schemes for alleviating problems of aircraft buffet at high angles of attack can be characterized as either passive or active.

Passive methods include, for example, strengthening and stiffening the aircraft structure itself; modifying the vortex flow field by aerodynamic devices such as wing leading edge extensions (LEX), fences, and wing leading edge blowing or sucking; and employing damping devices like viscoelastic layer constrainers, tuned vibration absorbers, and tuned dampers.

Active methods of buffet alleviation employ an active feedback control system to suppress the aircraft response due to buffet excitation. In this approach, buffet response signals are processed by a control law and fed back as input to a force generator which reduces the buffeting. Examples of proposed active feedback control concepts for suppressing buffet response include: aircraft flight control surfaces, such as the rudder; an auxiliary aerodynamic surface, such as a tip-mounted vane; and so-called "smart structures" involving piezoelectric actuators bonded to the tail.

Modifying the aircraft flight control system is disadvantageous because coupling a buffet suppression system with either the rudder or another primary flight control surface introduces safety risks and added complexity. Also, the buffet suppression system may possibly be rendered ineffective either because of the location of the flight control surface or because of high-frequency band width limitations on actuators for the flight control surface.

Tip-mounted vanes are disadvantageous because they add drag and may alter aircraft stability and handling qualities.

Smart structures involve emerging, but unproven technology. For example, piezoelectric actuators may require a large electrical power input to be effective. The change in the shape of the aircraft structure controlled by the piezoelectric actuator is small, thus limiting its effectiveness in producing aerodynamic control forces for buffet suppression.

SUMMARY OF THE INVENTION

The purpose of the present invention is to alleviate aircraft buffet response by an actively controlled, aerodynamic actuator device either embedded in or attached to the buffeted aircraft tail surface.

This purpose and the advantages of the present invention will become clear from a careful review of the accompanying drawings and a detailed study of the following description of the preferred embodiments.

BRIEF DESCRIPTION OF THE DRAWINGS

FIG. 1B is an enlarged view of details of a lower portion of the first embodiment.

FIG. 1C is an enlarged view of details of an upper portion of the first embodiment.

FIG. 1D is a cross-sectional view taken along line 1D—1D in FIG. 1C.

DETAILED DESCRIPTION OF THE PREFERRED EMBODIMENTS

Figure 1:
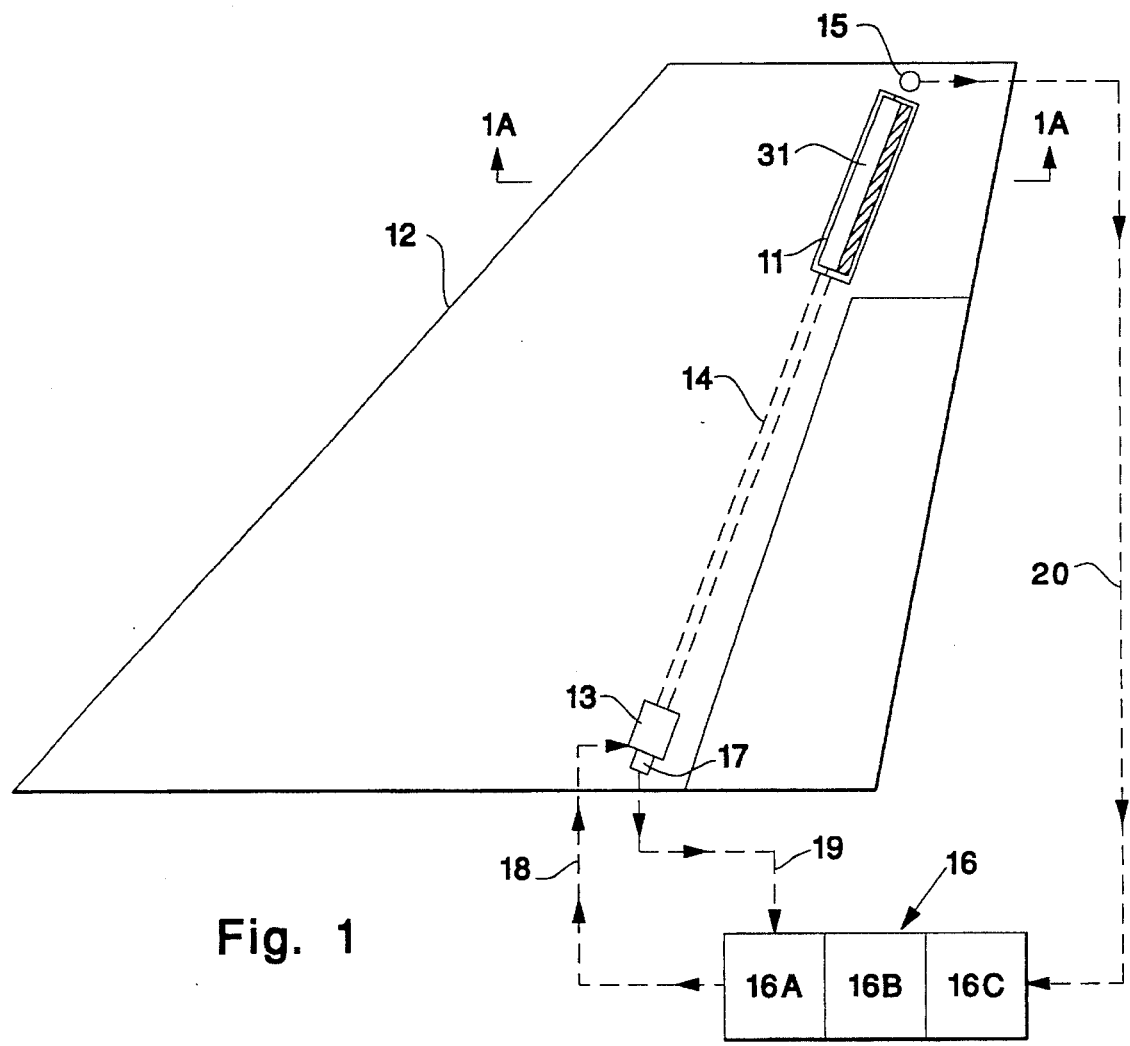
FIG. 1 is a schematic view of a first embodiment of the invention.

The first embodiment of the invention is illustrated schematically in FIG. 1. A rotatable slotted cylinder (hereinafter RSC) 11 is embedded in an aft section of a tail surface 12 which may be either horizontally or vertically oriented. The RSC 11 is connected at one end to a drive shaft 14 and rotates about its longitudinal axis under the control of a DC servo motor 13 which is connected to the RSC 11 at the other end of the drive shaft 14.

Figure 1A:
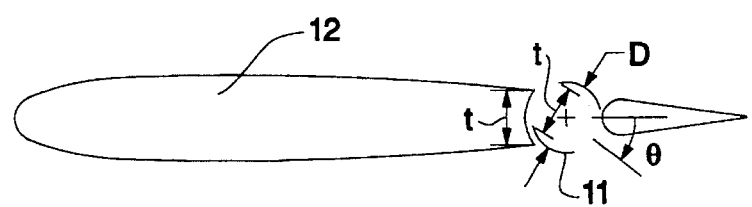
FIG. 1A is a cross-sectional view taken along line 1A—1A in FIG. 1.

As shown in FIG. 1A, longitudinal slot openings 31 in the RSC 11 are symmetrically aligned on diametrically opposite sides of the RSC 11. The chordwise length of each slot opening 31 is equal to a local thickness (t) of the airfoil section of the tail surface 12 at an upstream side of the outer circumferential wall of the RSC 11. The diameter (d) of a cross section of the RSC 11 is larger than the local thickness (t), typically twice as large. In a so-called "home" position, the RSC 11 is oriented with its slot openings 31 facing forward and aft, thus being shielded by the tail surface 12. The outer circumferential walls of the RSC 11 project symmetrically as small humps on both sides of the tail surface 12. Rotation of the RSC 11, up to ±45° maximum deflection relative to the home position, causes the mouth of its upstream slot opening to capture free air on one side of the tail surface 12 and to expel the free air from its downstream slot opening 31 on the other side of the tail surface 12. The resulting asymmetrical air flow field around the tail surface 12 generates the aerodynamic lift forces available for buffet suppression.

Because of the circular cross section of the RSC 11, pressures on its outer circumferential surface act radially, thus producing no torque about the rotational axis of the RSC 11. Similarly, the mass moment of inertia of the RSC 11 about its rotational axis is extremely low compared to that of conventional control surfaces. As a result of these minimal aerodynamic and inertial moments about the rotational axis of the RSC 11, a buffet suppression force can be achieved over a broad range of frequencies with minimal input power to the DC servo motor 13.

Turning now to FIGS. 1B, 1C and 1D, the operational details of the first embodiment will now be described. In FIG. 1B, a view of a lower portion of the first embodiment, as seen in FIG. 1, is enlarged to show the DC servo motor 13 to which a transducer 17 is attached at one end and to which the drive shaft 14 is connected at an opposite end. The transducer 17 sends signals out through line 19 while the DC servo motor 13 receives signals through line 18.

In FIG. 1C, a view of an upper portion of the first embodiment, as also seen in FIG. 1, shows the drive shaft 14 which terminates at the RSC 11 with its slot opening 31. FIG. 1D is an enlarged cross-sectional view, not drawn to scale, to show the RSC 11, as seen along line 1D—1D in FIG. 1C. The slot opening 31 is also illustrated in both FIGS. 1C and 1D.

A preferred example of an active control system for buffet suppression of the tail surface 12 embodying the present invention can be discussed again with reference to FIG. 1. The buffet response is sensed by an accelerometer 15 co-located with the RSC 11 on the tail surface 12. A signal is fed by line 20 to a control-law electronic device 16 which is positioned outside of the tail surface 12 and which modifies the phase and amplitude of the signal. Preferably, the electronic device 16 is secured inside the fuselage of the aircraft.

The control law can be either quite simple or very sophisticated, such as an "optimal control" algorithm. FIG. 1 shows the use of a simple control law which can be implemented by basic electronic analog or digital components. For example, the law controls the angular positions $\Theta$ of the RSC 11 so as to produce an aerodynamic damping force on the tail surface 12, thereby reducing the level of buffet response. In this example, the buffers response is sensed by the accelerometer 15 whose output signal is fed through the line 20 to an integrator 16C which has an output fed to a low pass filter 16B and then to an amplifier 16A. The angular position of the drive shaft 14 is sensed by the transducer 17 and an output signal from the transducer 17 is fed back to the amplifier 16A through the line 19. The output of the amplifier 16A via the line 18 powers the DC servo motor 13 to provide closed-loop control of the angular position $\Theta$ of the RSC 11. The control law can also be designed to accommodate other measurement signals, such as outputs from bending moment strain gages and additional accelerometers.

Computer simulation studies by the inventor have shown that a single sensor and a simple control law, such as the example described immediately above, can provide a significant reduction in the buffet response of the tail surface 12.

Figures 2, 2A:
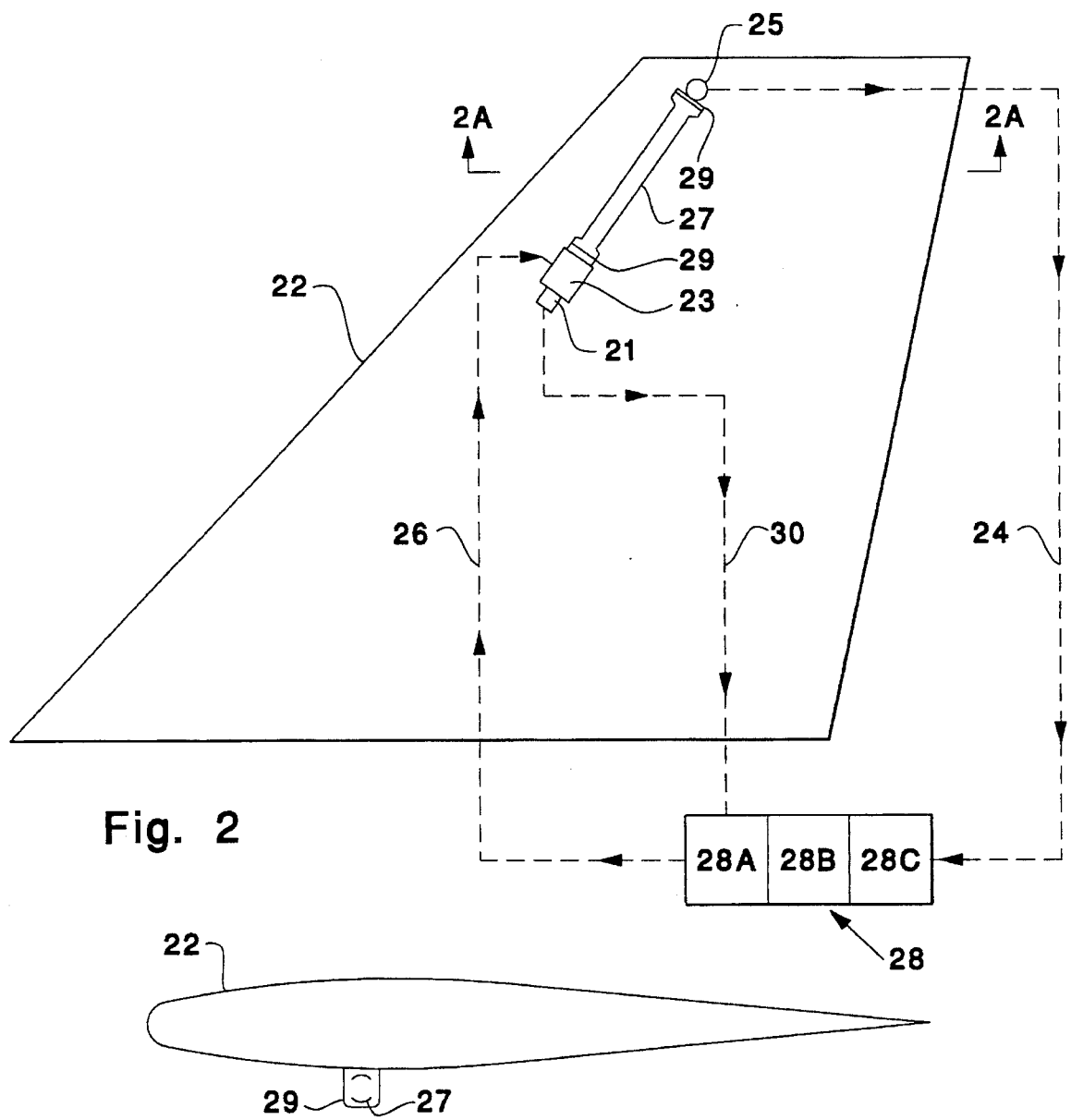
FIG. 2 is a schematic view of a second embodiment of the invention.
FIG. 2A is a cross-sectional view taken along line 2A—2A in FIG. 2.

An alternate embodiment of the invention is illustrated in a schematic view in FIG. 2. In this case, an RSC 27, a DC servo motor 23, and an accelerometer 25 are packaged as an integral unit which is retained by brackets 29 secured onto an external surface on one side of either a horizontal or a vertical tail surface 22. As seen in FIG. 2A, the rotational axis of the RSC 27 is oriented spanwise at or near the quarter-chord station of the tail surface 22 and the DC servo motor 23 drives the RSC 27 directly. In the "home" position, slot openings in the outer circumferential surface of the RSC 27 provide a passage for free stream air to flow parallel to the external surface of the tail surface 22. Rotation of the RSC 27 relative to the home position changes the pressure distribution on the tail surface 22 and, as a consequence, the associated lift force. The accelerometer 25 senses buffet response and sends a signal through a line 24 to a control-law electronic device 28 which modifies the phase and amplitude of the signal, in a manner similar to that illustrated in FIG. 1, by passing the signal first through an integrator 28C, then through a low pass filter 28B, and finally to an amplifier 28A. The angular position of the RSC 27 is sensed by a transducer 21 and its output signal is fed back to the amplifier 28A through a line 30. The output of the amplifier 28A drives the servo motor 23 to provide closed-loop control of the RSC 27. This alternate embodiment offers the advantage of ease of installation on existing structures, but does so at the expense of additional aerodynamic drag force disturbances. Otherwise, the closed-loop control of the RSC 27 in FIG. 2 is carried out in the same manner as the control of the RSC 11 in FIG. 1.

Wind tunnel tests of working models of the primary and alternate embodiments of the invention were performed by the inventor. The objective of these tests was to determine experimentally the aerodynamic lift and drag forces produced by the two RSC/airfoil configurations: first, the RSC 11 embedded at the airfoil three-quarter chord station; and second, the RSC 27 mounted adjacent to the external surface at the airfoil quarter chord station. These first and second configurations represent the primary and alternate embodiments of the present invention shown in FIGS. 1 and 2, respectively. The test article consisted of an airfoil section on which the RSCs 11 and 27 could be assembled to form either one of the two configurations. Steady state aerodynamic forces were measured as a function of rotational angles for each configuration of the RSCs 11 and 27. The wind tunnel test results, as well as computer simulation studies, support the conclusion that the primary and alternate embodiments of the present invention can provide effective closed-loop systems for the active suppression of buffet responses by the tail surfaces 12 and 22, respectively.

The foregoing preferred embodiments are considered illustrative only. Other modifications may readily occur to those persons skilled in aviation technology after reading this specification. Consequently, the disclosed invention is not limited by the exact constructions and operations shown and described above, but rather is defined by the claims appended hereto.

What I claim as my invention is:

1. A device for alleviating buffet response of a tail surface in a wake of turbulent vortex flow generated upstream by leading edges of wings on a high-speed aircraft operating at a high angle of attack during flight, comprising:

a rotatable cylinder means, mounted on the tail surface, for generating aerodynamic lift forces so as to suppress the buffet response, said rotatable cylinder means having slotted means for allowing free air to flow therethrough;

wherein said rotatable cylinder means having the slotted means provides a buffet suppression force over a broad range of signal frequencies.

2. A device, according to claim 1, wherein:

said rotatable cylinder means is embedded in the tail surface at about a three-quarter chord position.

3. A device, according to claim 2, further comprising:

a drive shaft connected at one end to the rotatable cylinder means; and a DC servo motor means, connected at an opposite end of the drive shaft, for controlling an angular position of the rotatable cylinder means.

4. A device, according to claim 2, wherein:

said slotted means has an upstream slot opening means for capturing the free air on one of two sides of the tail surface and a downstream slot opening means for expelling the free air on another of the two sides of the tail surface.

5. A device, according to claim 4, wherein:

each of said slot opening means has a chordwise length equal to a local thickness of an airfoil section of the tail surface at the upstream slot opening means.

6. A device, according to claim 1, wherein:

said rotatable cylinder means is attached to an external surface on one side of the tail surface at about a quarter chord position.

7. A device, according to claim 6, further comprising:

a DC servo motor means, connected at one end to the rotatable cylinder means, for directly controlling an angular position of the rotatable cylinder means.

8. A device, according to claim 6, wherein:

said slotted means has an upstream slot opening means for capturing the free air on one of two sides of the tail surface and a downstream slot opening means for expelling the free air on the same one of the two sides of the tail surface.

9. A device, according to claim 8, further comprising:

bracket means, secured onto the external surface on one side of the tail surface, for retaining the rotatable cylinder means on the same one side of the tail surface.

10. A device, according to claim 1, further comprising:

an accelerometer means, co-located with the rotatable cylinder means on the tail surface, for measuring buffet response and also for sending a signal; and a control means, positioned outside of the tail surface, for receiving the signal.

11. A device, according to claim 10, wherein:

said control means modifies phase and amplitude of the signal before transmitting the signal over the broad range of signal frequencies.

12. A device according to claim 11, further comprising:

a DC servo motor means, driven in response to the signal transmitted by the control means, for controlling an angular position of the rotatable cylinder means;

whereby an aerodynamic damping force is produced to alleviate the buffet response of the tail surface.

13. A device, according to claim 10, wherein:

said control means includes in series an integrator, a low pass filter and an amplifier through which the signal passes and is modified before being amplified and transmitted.

14. A device, according to claim 1, wherein:

said tail surface is a horizontal fin.

15. A device, according to claim 1, wherein:

said tail surface is a vertical fin.

* * * * *

UNITED STATES PATENT AND TRADEMARK OFFICE
CERTIFICATE OF CORRECTION

PATENT NO. : 5,549,260
DATED : August 27, 1996
INVENTOR(S) : Wilmer H. Reed, III Page 1 of 2

It is certified that error appears in the above—identified patent and that said Letters Patent is hereby corrected as shown below:

On the cover page, left column, Section [56], line 4, "Peterson" should be --Petersen--;

left column, Section [56], line 5, "Destaynder et al." should be --Destuynder et al.--;

left column, Section [56], line 7, "Mackay" should be --MacKay--;

left column, Section [56], line 8, "5,314,085" should be --5,314,308--;

left column, Section [56], line 11, "flaps" should be --Flaps--; and left column, Section [56], line 12, "engineering vol. 36 Oct. 10, 1964 pp. 304-309, Caldevon." should be --Engineering, Vol. 36, No. 10, October 1964, pp. 304-309, by Calderón.--.

UNITED STATES PATENT AND TRADEMARK OFFICE
CERTIFICATE OF CORRECTION

PATENT NO. : 5,549,260
DATED : August 27, 1996
INVENTOR(S) : Wilmer H. Reed, III It is certified that error appears in the above—identified patent and that said Letters Patent is hereby corrected as shown below:

In column 3, line 28, "buffers" should be --buffet--.

Signed and Sealed this

Fourth Day of February, 1997

Attest:

BRUCE LEHMAN

*Attesting Officer*  *Commissioner of Patents and Trademarks*